(12) United States Patent
Kuroda et al.

(10) Patent No.: US 9,045,104 B2
(45) Date of Patent: Jun. 2, 2015

(54) ROUGH-TERRAIN TRAVELING VEHICLE

(71) Applicant: HONDA MOTOR CO., LTD., Tokyo (JP)

(72) Inventors: Kosuke Kuroda, Wako (JP); Tadashi Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/220,569

(22) Filed: Mar. 20, 2014

(65) Prior Publication Data
US 2014/0292039 A1 Oct. 2, 2014

(30) Foreign Application Priority Data
Mar. 26, 2013 (JP) .................................. 2013-064596

(51) Int. Cl.
*B62D 25/06* (2006.01)
*B60R 21/13* (2006.01)

(52) U.S. Cl.
CPC ..................................... *B60R 21/13* (2013.01)

(58) Field of Classification Search
CPC ........................................................ B60R 21/13
USPC ............................... 296/203.01, 205; 180/312
See application file for complete search history.

(56) References Cited

U.S. PATENT DOCUMENTS

| | | | |
|---|---|---|---|
| 7,249,798 B2 * | 7/2007 | Saito et al. .................... | 296/205 |
| 7,735,903 B2 * | 6/2010 | Yamamura et al. ...... | 296/187.12 |
| 7,967,100 B2 | 6/2011 | Cover et al. | |
| 2013/0256050 A1 * | 10/2013 | Novotny et al. .............. | 180/271 |

* cited by examiner

*Primary Examiner* — Pinel Romain
(74) *Attorney, Agent, or Firm* — Rankin, Hill & Clark LLP

(57) ABSTRACT

A rough-terrain traveling vehicle equipped with a front seat roll bar and a rear seat roll bar is adapted to allow use of only the front seat roll bar. The front seat roll bar includes a top middle cross pipe extending left and right in the vehicle width direction, and left and right middle side pipes extending to the top middle cross pipe. Left and right gussets are provided at left and right assembly points where the left and right middle side pipes and the top middle cross pipe each are connected. When attachment screws are inserted into the left and right gussets, the rear seat roll bar is joined to the front seat roll bar.

19 Claims, 8 Drawing Sheets

ROUGH-TERRAIN TRAVELING VEHICLE

BACKGROUND OF THE INVENTION

1. Field of the Invention

The present invention generally relates to an improvement of a rough-terrain traveling vehicle and, more particularly, to roll bars used on such rough-terrain traveling vehicles.

2. Description of Related Art

There is known a vehicle which travels an irregular ground such as a rough terrain or the like (see U.S. Pat. No. 7,967,100 (FIGS. 1 and 12), for example).

In FIG. 1 of the above-mentioned patent, there is shown a rough-terrain traveling vehicle capable of traveling over rough terrain. In this rough-terrain traveling vehicle, a front seat (7) (numerals in parenthesis are reference characters as designated in the above-mentioned patent but names of component parts may be partially modified herein) and a rear seat (8) are arranged in the front and in the rear, respectively. A lateral side and an upper side of the front seat (7) are surrounded with a front seat roll bar, while a lateral side and an upper side of the rear seat (8) are surrounded with a rear seat roll bar.

The construction of the roll bar is shown in FIG. 12 of the above-referenced patent. The front seat roll bar includes a left and right roof supports (16b, 16b) extending diagonally upwardly to the rear of the vehicle, a left and right roof pipe front half bodies (19a, 20a) each extending rearwardly from rear ends of the left and right roof supports (16b, 16b), a left and right center pillars (17b, 17b) extending downwardly from the left and right roof pipe front half bodies (19a, 20a), and a cross pipe (22) extending between the left and right center pillars (17b, 17b).

The rear seat roll bar includes left and right roof pipe rear half bodies (19b, 20b) extending rearwardly from rear ends of the left and right roof pipe front half bodies (19a, 20a), left and right rear pillars (18b, 18b) extending downwardly from the left and right roof pipe rear half bodies (19b, 20b), and a cross pipe (23) extending between the left and right rear pillars (18b, 18b). Front ends of the left and right roof pipe rear half bodies (19b, 20b) are connected to the rear ends of the left and right roof pipe front half bodies (19a, 20a).

The left and right roof pipe half bodies (19a, 20a) extend to the rear sides of the left and right center pillars (17b, 17b). Thus, since the left and right roof pipe half bodies project to the rear of the vehicle, there is no way to use the front seat roll bar when the rear seat roll bar is removed.

SUMMARY OF THE INVENTION

In view of the above, the present invention is directed toward a rough-terrain traveling vehicle equipped with the front seat roll bar and the rear seat roll bar that permits use of the front seat roll bar when the rear seat roll bar is removed.

In accordance with the present invention, there is provided a rough-terrain traveling vehicle including a front seat including a driver's seat on which a driver sits for steering and a passenger seat arranged side by side with the driver's seat so as to allow at least one front seat passenger to sit thereon. The vehicle further includes a rear seat located to the rear of the front seat so as to allow at least one rear seat passenger to sit thereon. The rear seat is mounted in the vehicle in a foldable or removable manner. A front seat roll bar for the front seat and a rear seat roll bar for the rear seat, which cover upper sides of the driver, the front seat passenger and the rear seat passenger, are provided separately in a removable manner. The front seat roll bar includes a top middle cross pipe extending leftward and rightward in a vehicle width direction above a rear part of the front seat, and left and right middle side pipes extending from a vehicle body frame to the top middle cross pipe on outer sides in the vehicle width direction of the front seat. A left gusset extends between the left middle side pipe and the top middle cross pipe at a left assembly point where the left middle side pipe and the top middle cross pipe are connected. A right gusset extends between the right middle side pipe and the top middle cross pipe at a right assembly point where the right middle side pipe and the top middle cross pipe are connected. The left and right gussets have surfaces perpendicular to an extending direction of left and right attachment screws, respectively, so as to couple the rear seat roll bar to the front seat roll bar when the attachment screws are fitted in the gussets through the surfaces in a forward and rearward direction of the vehicle.

Since the left and right gussets extend between each of the left and right middle side pipes and the top middle cross pipe at the left and right assembly points where the left and right middle side pipes and the top middle cross pipe are connected, the front seat roll bar is firmly reinforced by the left and right gussets.

In addition, the left and right gussets located at the left and right assembly points where the left and right middle side pipes and the top middle cross pipe are connected, are provided with the surfaces perpendicular to the extending direction of the attachment screws. The rear seat roll bar is coupled to the front seat roll bar when the attachment screws extending in a forward and rearward direction of the vehicle are fitted in the perpendicular surfaces of the gussets. By virtue of this construction, when the rear seat roll bar has been removed, rearwardly protruding projections can be eliminated from the front seat roll bar. As a result, it is possible to provide the rough-terrain traveling vehicle capable of being used even in the case where only the front seat roll bar is mounted on the vehicle body frame.

In further accordance with the present invention, the top middle cross pipe extends outwardly from a center in the vehicle width direction and then is bent forwardly in the vicinity of joined sections to the left and right middle side pipes, one pipe between each of the left and right middle side pipes. The top middle cross pipe has an end at a joined position while the other pipe between each of the left and right middle side pipes and the top middle cross pipe extends further in the forward direction of the vehicle from the joined position. The left and right gussets extend from the one pipe to the other pipe on a large scale whereby to form left and right coupling sections to which the rear seat roll bar is coupled. The top middle cross pipe is bent forwardly in the vicinity of the joined sections to the left and right middle side pipes, and one pipe between each of the left and right middle side pipes and the top middle cross pipe has a terminal end at the joined position while the other pipe extends in the forward direction of the vehicle from the joined position. Like this, since the attachment screws are arranged in a space formed by a bend of the one pipe, it is possible to effectively use the space which otherwise may become dead space, and the left and right joined sections can be compact.

In further accordance with the present invention, left and right front pipes extend in the forward and rearward direction of the vehicle to form the front seat roll bar, and left and right rear pipes extend in the forward and rearward direction of the vehicle to form the rear seat roll bar. The left and right front pipes and the left and right rear pipes have substantially the same positions in a height direction and in the vehicle width direction. The attachment screws are located in positions offset inwardly in the vehicle width direction from each of center axes of the left and right front pipes and each of center axes of the left and right rear pipes.

Since the left and right front pipes and the left and right rear pipes each are coupled so as to extend linearly at a front and rear of the vehicle, the rigidity of the roll bars can be increased in comparison with the case where they do not extend linearly in front of and in the rear of the vehicle. Moreover, the attachment screw are located in the positions offset inwardly from each of center axes of the left and right front pipes and each of center axes of the left and right rear pipes. Since the attachment screws are arranged in the positions offset inwardly from the center axes of the front and rear pipes, the attachment screw can be spaced apart from the front and rear pipes by maintaining a large offset amount. When the attachment screws are spaced apart from the front and rear pipes, the front and rear pipes due not interfere with a tool during turning of the attachment screws. As a result, it is possible to improve the workability for attaching and removing the rear seat roll bar.

In further accordance with the present invention, the left and right middle side pipes forming the front seat roll bar include left and right first middle side pipes and left and right second middle side pipes extending in the rearward direction of the left and right first middle side pipes, and the rear seat roll bar includes left and right rear side pipes and a rear upper cross pipe extending between the left and right rear side pipes. The left and right middle side pipes include the left and right first middle side pipes and the left and right second middle side pipes. Since the left and right middle side pipes are provided dividable in the forward and rearward direction of the vehicle, the front seat roll bar can be decreased in size when being disassembled, while maintaining the rigidity of the front seat roll bar. Similarly, since the rear seat roll bar is formed with three-piece construction including the left and right rear side pipes and the rear upper cross pipe extending between the left and right rear side pipes, the front seat roll bar and the rear seat roll bar can be decreased in size when being disassembled, while maintaining the rigidity of the rear seat roll bar.

In further accordance with the present invention, vehicle body frame mounting portions in which the left and right middle side pipes are mounted on the vehicle body frame are located in a forward position of the vehicle relative to the left and right coupling sections, and the left and right middle side pipes extend diagonally upwardly to the rear from the vehicle body frame mounting portions. Thus, the left and right middle side pipes that extend diagonally upwardly to the rear from the vehicle body frame mounting portions can be brought close to the diagonally rearwardly and upwardly extending inclination angle of the upper half of an passenger that sits on the front seat when the passenger gets on and off the vehicle, so that it is possible to improve the getting on and off performance of the front seat passenger.

In further accordance with the present invention, the front seat roll bar further includes a front upper cross pipe extending between the left and right middle side pipes in front of the top middle cross pipe. The front upper cross pipe is located inwardly in the vehicle width direction, with respect to left and right front joint portions in which the front upper cross pipe is joined to the left and right middle side pipes, and extends in a forward position of the vehicle with respect to these left and right front joint portions. Since the front upper cross pipe is located inwardly in the vehicle width direction with respect to the left and right front joint portions, the head of the front seat passenger is able to be prevented from coming in contact with the front upper cross pipe when the front seat passenger moves left and right within the vehicle, so that the comfortableness of the front seat passenger can be improved.

BRIEF DESCRIPTION OF THE DRAWINGS

These and further features of the present invention will be apparent with reference to the following description and drawings, wherein.

DETAILED DESCRIPTION OF THE INVENTION

Figure 1:
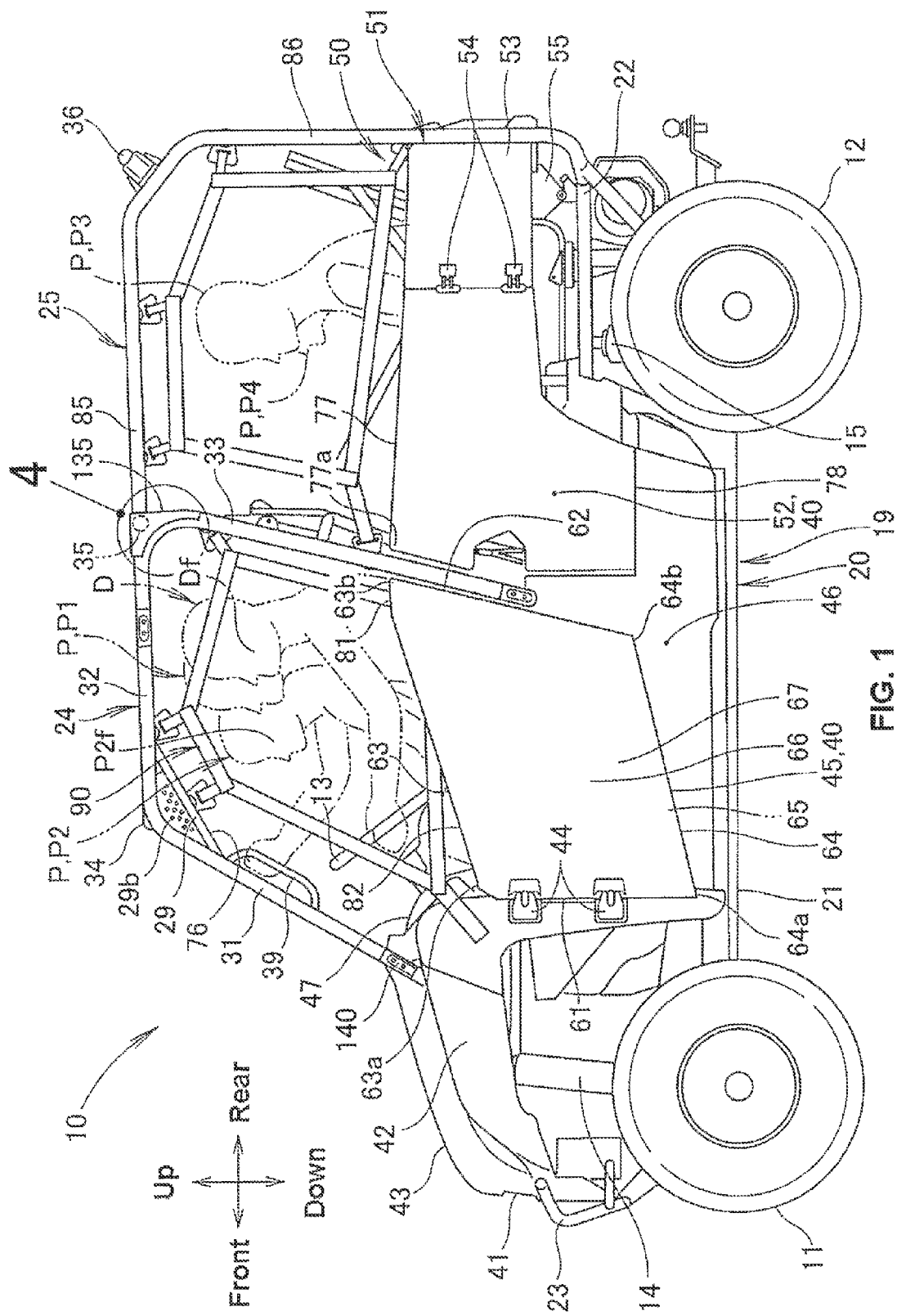
FIG. 1 is a left side view of a rough-terrain traveling vehicle in accordance with the present invention.

An embodiment of the present invention will be explained in detail with reference to accompanying drawings. In the drawings and embodiment, the orientation such as "upper", "lower", "front", "rear", "left" and "right" is indicated with reference to a driver riding on a rough-terrain traveling vehicle. The embodiment of the present invention will be explained below with reference to the accompanying drawings.

Referring now to FIG. 1, the vehicle 10 is a rough-terrain traveling vehicle of left steering wheel drive type that is equipped with a four wheel independent suspension system suitable for traveling a rough terrain. In a forward section of a vehicle body 19 including a vehicle body frame 20, left and right front wheels 11 are suspended independently, while in a rearward section of the vehicle body frame 20, left and right rear wheels 12 are suspended independently. By the way, although in this embodiment a steering wheel 13 is located on the left side, it is not so limited, but the steering wheel 13 may be located on the right side.

The vehicle body frame 20 includes a center frame 21 being located in a central section in the vehicle width direction and extending in the forward and rearward direction of the vehicle, a rear frame 22 extending rearwardly from a center portion of the center frame 21 while being located above and in parallel with the center frame 21, a bumper 23 being located in a forward end section of the center frame 21 so as to protect a front part of the vehicle 10, a front seat roll bar 24 being located on a front upper side of the center frame 21 and formed in the shape of an arch in a side view, and a rear seat roll bar 25 extending rearwardly from an upper rear end of the front seat roll bar 24 and being formed in substantially an L-shape in a side view.

Further, the front part of the vehicle 10 includes a front cover 41 provided in a front end portion so as to cover a front end of the vehicle 10, a front fender 42 provided in a rear portion of the front cover 41 so as to cover an upper side and a rear side of the front wheel 11, a front upper cover 43 provided above the front fender 42 so as to cover a front upper side of the vehicle 10, and a front door 45 provided in the rear of the front fender 42 so as to be opened and closed through a hinge 44.

The rear part of the vehicle 10 includes a side cover 46 being arranged in the rear of the front door 45 so as to cover a lateral side of the vehicle 10, and a rear side cover 51 being arranged on an upper rear side of the side cover 46 and forming a load carrying platform 50. A front section of the rear side cover 51 is formed with a rear door 52 while a rear section thereof is formed with a rear panel 53 to be mounted on the vehicle body frame 20. The rear door 52 is provided in a front end of the rear panel 53 in an openable and closable fashion through a hinge 54.

The load carrying platform 50 is supported through a stay 55 on the rear frame 22. The front wheel 11 is supported by a front cushion 14, while the rear wheel 12 is supported by a rear cushion 15. An instrument panel 43 is located in the rear of the front upper cover 43, and the steering wheel 13 is arranged in the vicinity of the instrument panel 47.

Figure 2:
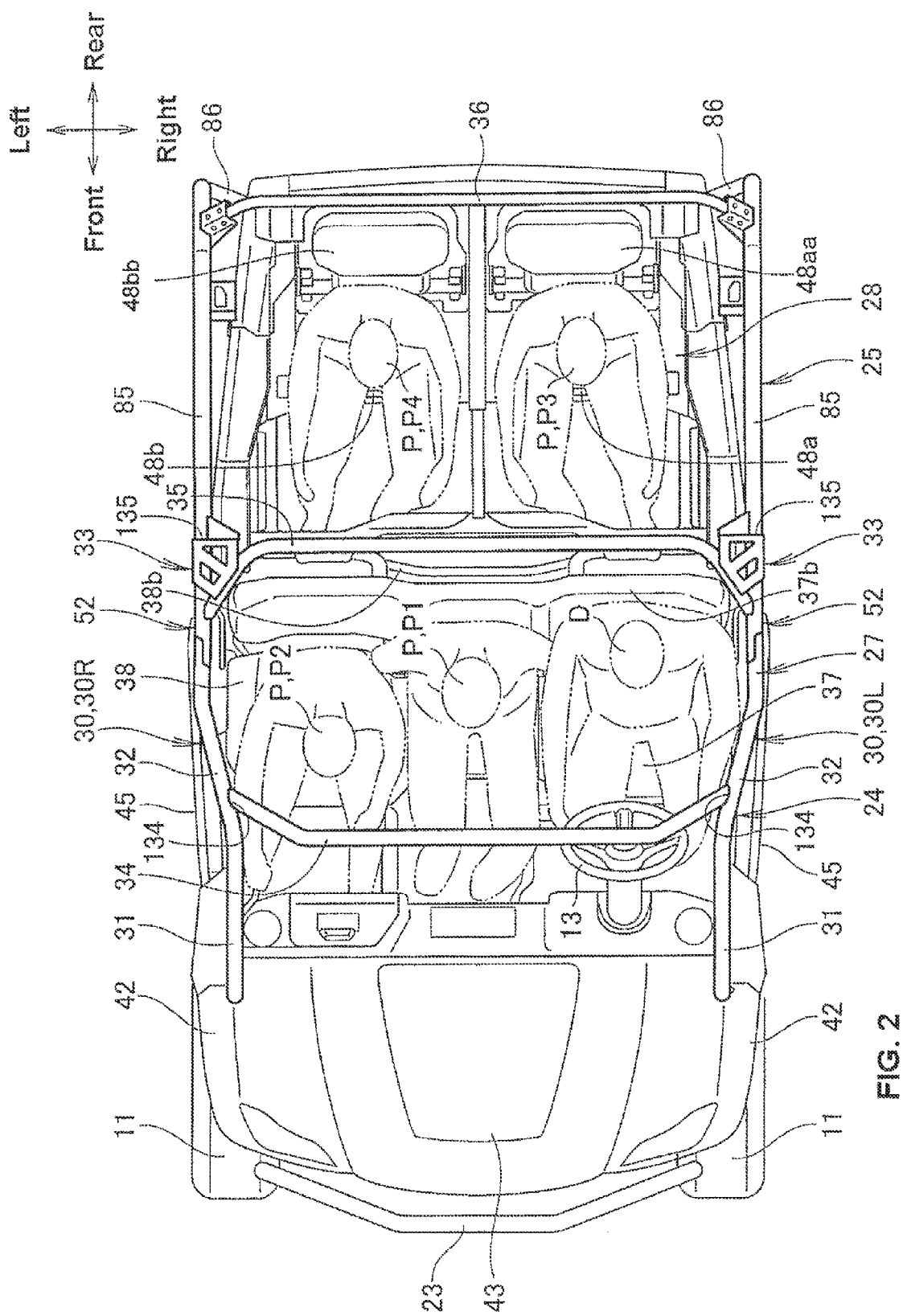
FIG. 2 is a plan view of the rough-terrain traveling vehicle in accordance with the present invention.

As shown in FIG. 2, the front seat roll bar 24 includes left and right front pillars 31, 31 extending rearwardly and upwardly from the upper side of the front fender 42, left and right front roof side rails 32, 32 extending rearwardly from upper ends of the left and right front pillars 31, 31, support pipes 29, 29 (see FIG. 1) extending between each of the left and right front pillars 31, 31 and each of the left and right front roof side rails 32, 32, left and right center pillars 33, 33 extending downwardly from rear sections of the left and right front roof side rails 32, 32, a top middle cross pipe 35 extending between the left and right center pillars 33, 33, a front upper cross pipe 34 extending between upper ends of the left and right front pillars 31, 31, and a grip 39 (see FIG. 1) on a frame side provided on the right front pillar 31 so as to be gripped by a passenger. In FIG. 1, each of the support plates 29b, 29b is arranged in areas surrounded by the left and right front pillars 31, 31, the left and right front roof side rails 32, 32 and the support pipes 29, 29 (see FIG. 1).

As shown in FIG. 2, left and right middle side pipes 30, 30 each are composed of the left and right front pillars 31, 31, the left and right front roof side rails 32, 32 extending rearwardly from the upper ends of the left and right front pillars 31, 31, and the left and right center pillars 33, 33 extending downwardly from the rear sections of the left and right front roof side rails 32, 32.

The rear seat roll bar 25 includes left and right rear roof side rails 85, 85 extending rearwardly from upper ends of the left and right center pillars 33, 33, left and right rear pillars 86, 86 extending downwardly from rear ends of the left and right roof side rails 85, 85, and a rear upper cross pipe 36 extending between rear portions of the left and right rear roof side rails 85, 85.

A seat assembly is composed of a front seat 27 located in front, and a rear seat 28 located in the rear of the front seat 27. The front seat 27 includes, from the left to the right in the vehicle width direction, a driver's seat 37 on which the driver D sits to steer the steering wheel 13, and a front seat passenger seat 38, which is located side by side with the driver's seat 37, to be seated by two passengers P1, P2 as a passenger P. Namely, the driver D and two passengers P1, P2 are able to sit on the seat 26, and the driver D and passengers P1, P2 are able to get on and off the vehicle by opening and closing the front door 45. By the way, the front seat passenger seat 38 may be occupied by a single person. The front seat roll bar 24 is located above the rear of the front seat 27.

The driver's seat 37 includes a driver's seat back 37b to be brought into contact with the back of the driver D, and the front passenger seat 38 includes a front seat passenger seat back 38b to be brought into contact with the backs of the passengers P1, P2. The rear seat 28 located in the rear includes rear seat passenger seats 48, 48 on which passengers P3, P4 sit. Namely, rear passenger seats 48 also serve as a load carrying platform. The passenger seat 48a on the left side has a seat back 48aa for the rear seat passenger, while the passenger seat 48b on the right side has a seat back 48bb for the rear seat passenger. These left and right rear seat passenger seat backs 48aa, 48bb are able to be lowered or flattened separately in the forward direction, whereby the load carrying platform 50 (see FIG. 1) is able to be extended forwardly.

In a side view of the vehicle in FIG. 1, the door 40 includes left and right front doors 45, 45 (only one reference character 45 at this side is designated) for allowing the driver D and the passenger P (the front seat passengers P1, P2) to get on and off the vehicle, and left and right rear doors 52, 52 (only one reference character 52 at this side is designated) provided in the rear of the left and right front doors 45, 45 so as to allow the passenger (the rear seat passengers P3, P4) to get on and off the vehicle. The left and right center pillars 33, 33 (only one reference character 33 at this side is designated) are located between each of the left and right front doors 45, 45 and each of the left and right rear doors 52, 52, respectively.

The door 40 is composed of the left and right front doors 45, 45 and the left and right rear doors 52, 52. Since the arrangement between the left and right front doors 45, 45 and the arrangement between the left and right rear doors 52, 52 are symmetrical in relation to each other, an explanation will be made with respect to the left front door 45 and the left rear door 52, and the explanation with respect to the right front door 45 and the right rear door 52 will be omitted.

The left front door 45 has a front edge 61 and a rear edge 62 extending in the height direction, an upper edge 63 extending between the front edge 61 and the rear edge 62, and a lower edge 64 extending between a lower end of the front edge 61 and a lower end of the rear edge 62. A first outside plate surface 65 is formed in an area surrounded with the front edge 61, the rear edge 62, the upper edge 63 and the lower edge 64. The first outside plate surface 65 is covered from outside in the vehicle width direction with a left door decorative panel 67 having a second outside plate surface 66. When the left front door 45 is made of non-painted, substantially black resin and is covered with the painted left door decorative panel 67 in accordance with the specifications of the vehicle, for example, an increase in the cost may be controlled, and it is possible to easily respond to the addition of the specifications of the vehicle.

An upper side of the door 40 is open such that a face Df of the driver D or a face P2f of the passenger P2 can be seen from outside. An opening section 76 is formed between the upper side of the door 40 and the front seat roll bar 24. Although in this opening section 76, a window glass is not provided, a side net 90 is spread over the opening section 76 instead.

By the way, when viewed from a lateral side of the vehicle, a forward part 82 of the upper edge 63 of the front door 45 forming the door 40 is lowered in relation to a part 81 with which the driver or the passenger overlaps. In this embodiment, the upper edge 63 of the door 45 increases in height gradually from a front end 63a to a rear end 63b in a longitudinal direction of the vehicle. Namely, the rear ends 63b, 63b of the upper edges 63, 63 of the left and right front doors 45, 45 are higher than the front ends 63a, 63a of the upper edges 63, 63 of the left and right front doors 45, 45.

The lower edge 64 of the front door 45 extends rearwardly and upwardly to the rear of the vehicle. Namely, rear ends 64b of the lower edges 64 of the left and right front doors 45 are higher than front ends 64a of the lower edges 64 of the left and right front doors 45. In addition, rear ends of lower edges of the left and right rear doors 52 are higher than front ends of lower edges of the left and right rear doors 52.

With respect to a relationship in the height direction between the upper edge 63 of the front door 45 and an upper edge 77 of the rear door 52, a front section 77a of the upper edge 77 of the rear door 52 has substantially the same height as the part 81 of the front door 45 with which the driver D or the passenger P overlaps.

Figure 3:
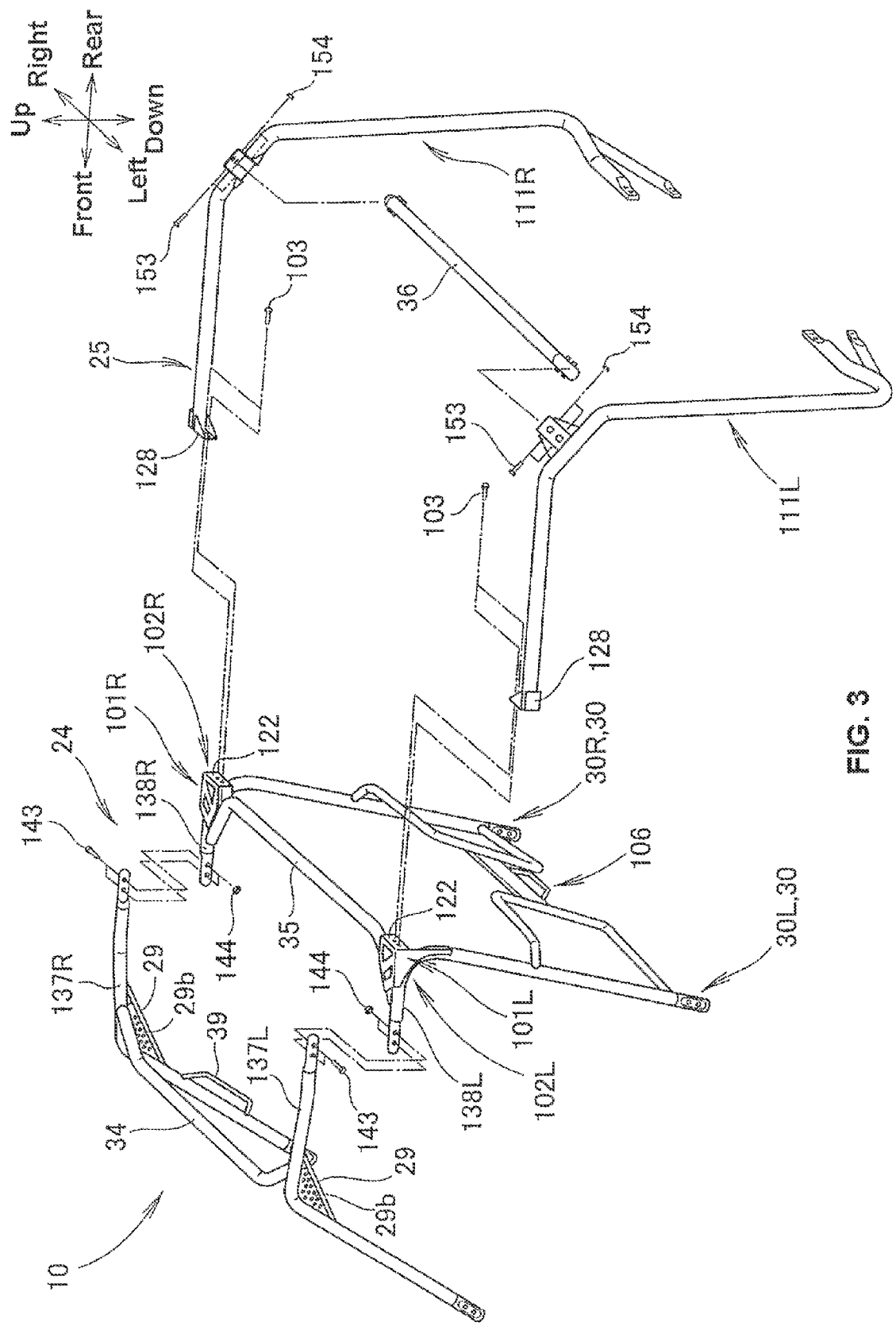
FIG. 3 is an exploded perspective view of a roll bar in accordance with the present invention.

As shown in FIG. 3, the front seat roll bar 24 includes the top middle cross pipe 35 extending left and right in the vehicle width direction, and left and right middle side pipes 30L, 30R extending from the vehicle body frame 20 (see FIG. 1) to the top middle cross pipe 35 at outsides in the vehicle width direction of the front seat 27 (see FIG. 2).

The left and right middle side pipes 30L, 30R each are composed of left and right first middle side pipes 137L, 137R, and left and right second middle side pipes 138L, 138R. The left and right second middle side pipes 138L, 138R extend rearwardly from the rear of the left and right first middle side pipes 137L, 137R, respectively. The coupling construction between the first middle side pipes 137L, 137R and the second middle side pipes 138L, 138R will be explained later.

At a left assembly point 101L where the left middle side pipe 30L and the top middle cross pipe 35 are connected, there is provided a left gusset 102L that extends between the left middle side pipe 30L and the top middle cross pipe 35.

Similarly, at a right assembly point 101R where the right middle side pipe 30R and the top middle cross pipe 35 are connected, there is provided a right gusset 102R that extends between the right middle side pipe 30R and the top middle cross pipe 35. When assembly screws (fastening bolts 103) are inserted into each of the left and right gussets 102L, 102R so as to extend therethrough in the forward and rearward direction of the vehicle, the rear seat roll bar 25 is coupled or joined to the front seat roll bar 24.

A middle cross member 106 extends between the left and right middle side pipes 30L, 30R. On this middle cross member 106 there are mounted the driver's seat back 37b (see FIG. 2) and the front seat passenger seat back 38b (see FIG. 2). The middle cross member 106 functions as a member that increases the rigidity of the front seat roll bar 24.

The rear seat roll bar 25 is composed of left and right rear side pipes 111L, 111R formed in substantially an L-shape in a side view of the vehicle, and the rear upper cross pipe 36 extending between the left and right rear side pipes 111L, 111R. By the way, the coupling construction between the rear side pipe and the rear upper cross pipe will be explained later.

Next, the coupling construction, etc. between the front seat roll bar 24 and the rear seat roll bar 25 will be explained. The rear seat roll bar 25 is connected to the front seat roll bar 24 in two (i.e., left and right) places in the vehicle width direction. Hereunder, the coupling construction on the left side in the vehicle width direction will be explained wherein an index "L" is removed from the reference character. In addition, since the left and right coupling constructions are symmetrical in the vehicle width direction with respect to each other, an explanation of the right coupling construction will be omitted.

Figure 4:
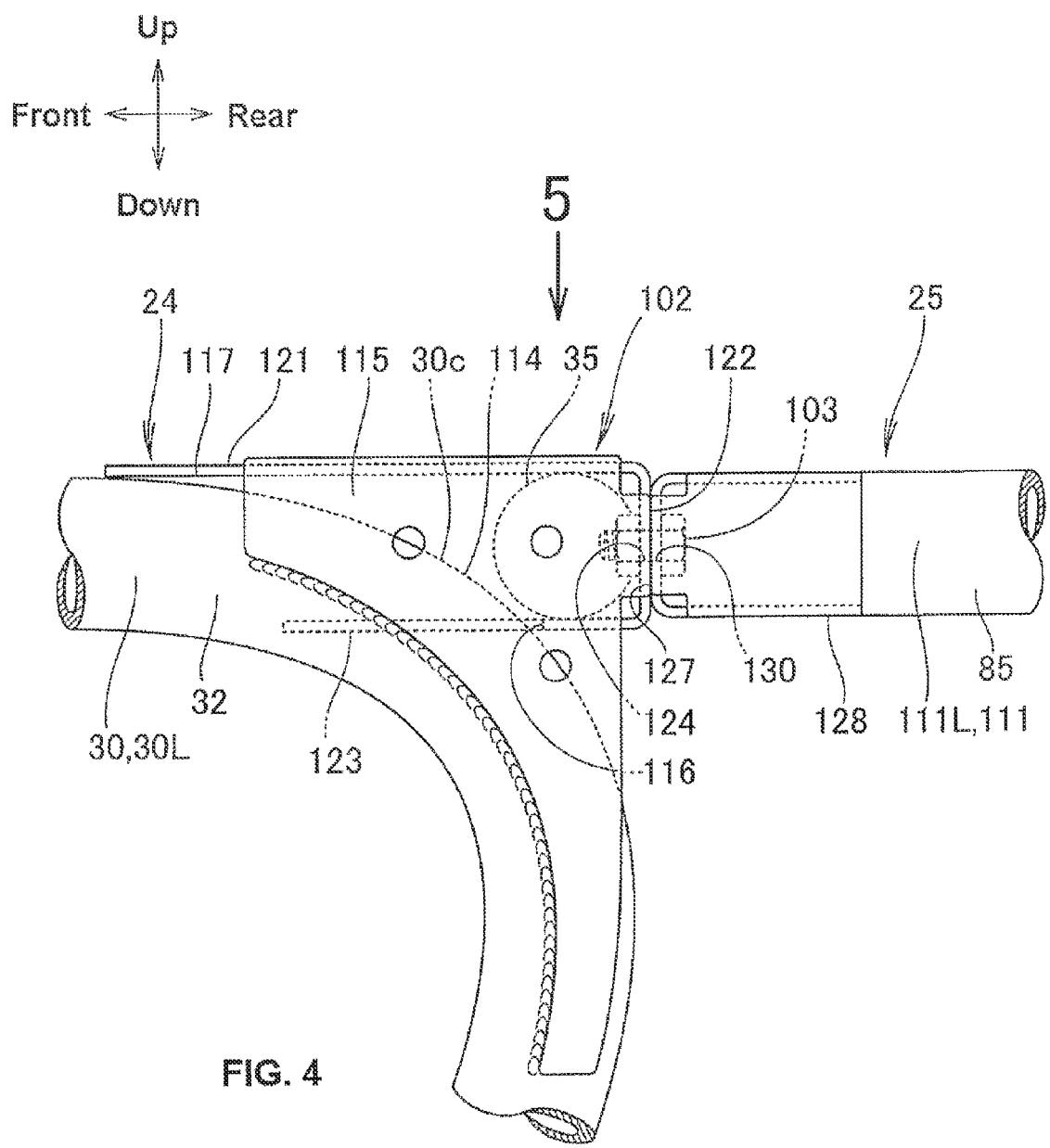
FIG. 4 is an enlarged view of a section 4 of FIG. 1.

As shown in FIG. 4, a downward bend portion 114, which is bent from a horizontal direction to substantially a downward direction, is provided in a rear upper part 30c of the middle side pipe 30. The gusset 102 is attached on the downward bend portion 114. The gusset 102 has a lateral plate 115 of a flat plate shape, which is allowed to abut on the downward bend portion 114 from outside in the vehicle width direction, and a cutout portion 116 through which the middle side pipe 30 passes. The gusset 102 is joined to a U-shaped member 117, which is formed in a U-shape in cross section that is opened forwardly of the vehicle, in a side view of the vehicle. The U-shaped member 117 includes an upper surface 121 extending horizontally in the forward and rearward direction, a butted surface 122 formed as a vertical surface that extends vertically downwardly (extends in the upward and downward direction and in the left and right direction) from a rear end of the upper surface 121 and against which the rear seat roll bar 25 is butted so as to be coupled thereto, and a lower surface extending forwardly from the butted surface 122 and having the cutout portion 116.

Figure 5:
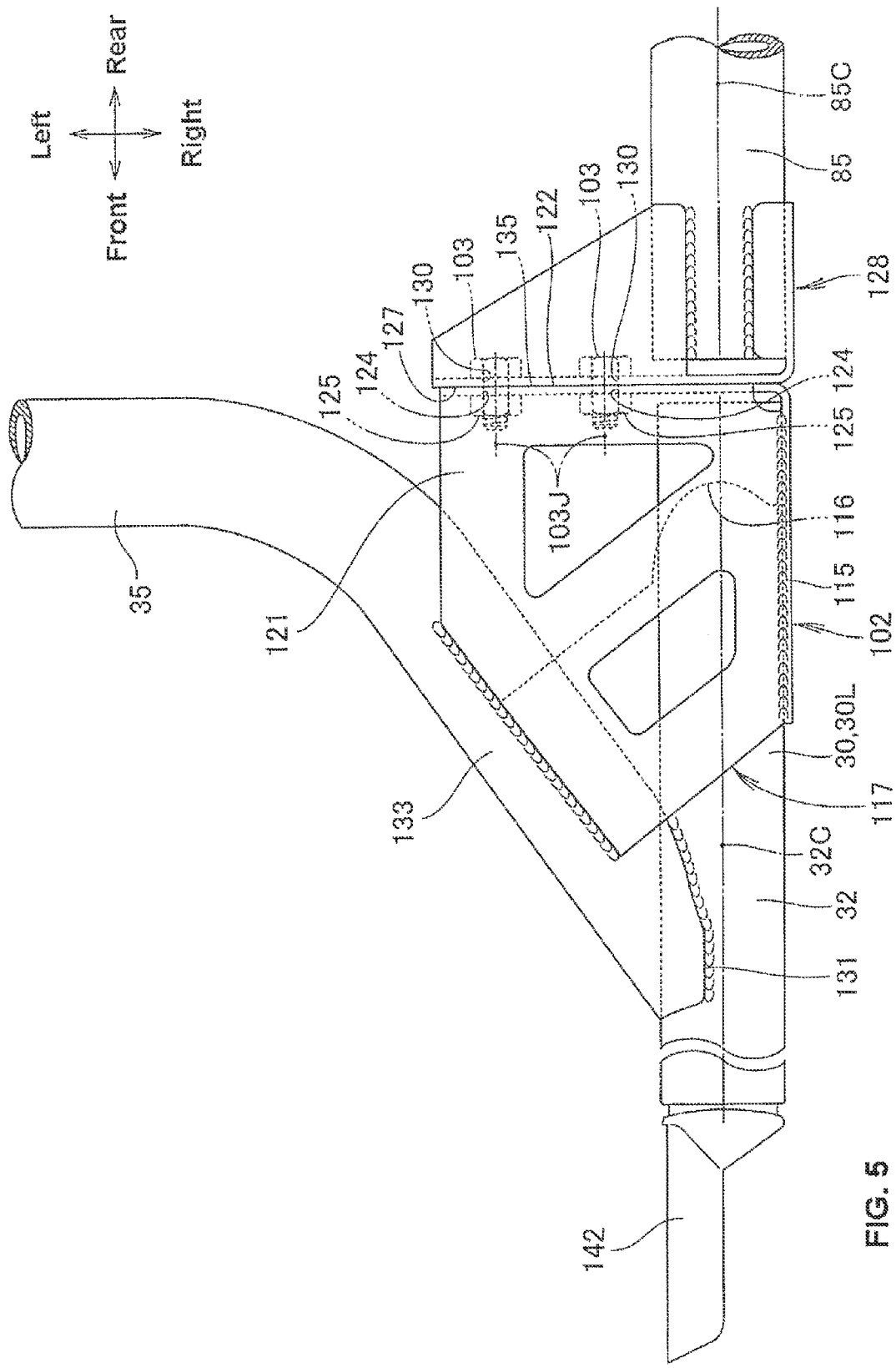
FIG. 5 is a view in the direction indicated by arrow 5 of FIG. 4.

As shown in FIG. 5, two fastening holes 124 are provided in the butted surface 122 and two weld nuts 125 corresponding to the fastening holes 124 are welded to a forwardly facing vertical surface on the opposite side of the butted surface 122.

A bracket 128 formed with a vertical butting surface 127 is welded to the rear seat roll bar 25. The bracket 128 is a member formed in a U-shape in cross section that is opened in the rearward direction of the vehicle in a side view, and has the butting surface 127 configured to abut on the butted surface 122. Bolt holes 130 are formed in the butting surface 127 through which the fastening bolts 103 are inserted.

The top middle cross pipe 102 extends outwardly from a center in the vehicle width direction and has a bend portion (a forward bend portion 133) which is bent forwardly of the vehicle in the vicinity of a joined point to the middle side pipe 30. The top middle cross pipe 35 has a terminal end 131 at the joined point, while the middle side pipe 30 extends further forwardly of the vehicle.

The gusset 102 extends inwardly in the vehicle width direction on a large scale from the middle side pipe 30 to the top middle cross pipe 35 whereby to form a coupling section 135 to which the rear seat roll bar 25 is coupled or connected. By the way, in this embodiment, although the top middle cross pipe has the terminal end 131, the middle side pipe 30 may be ended at the joined point and the top middle cross pipe 35 may be extended further forwardly of the vehicle.

The front pipe (the front roof side rail 32) for forming the front seat roll bar 24, which extends in the forward and rearward direction of the vehicle, and the rear pipe (the rear roof side rail 85) for forming the rear seat roll bar 25, which extends in the forward and rearward direction of the vehicle, have substantially the same locations in the height direction and in the vehicle width direction. Namely, a center axis 32C of the front roof side rail 32 is aligned with (i.e., coaxial), or corresponds to a center axis 85C of the rear roof side rail 85. Then, the fastening bolt 103 as an attachment screw is located in a position offset inwardly in the vehicle width direction from the center axis 32C of the front roof side rail 32 and the center axis 85C of the rear roof side rail 85, as shown best in FIG. 5.

In FIG. 1, vehicle body frame mounting portions 140, 140 (only one reference character 140 on this side is shown in the drawing) in which the middle side pipe 30 is mounted on the vehicle body frame 20 are located forwardly of the vehicle in relation to the coupling sections 135, 135 (only one reference character 135 on this side is shown in the drawing). The middle side pipes 30, 30 extend diagonally rearwardly and upwardly from the vehicle body frame mounting portions 140, 140.

In FIG. 2, the front seat roll bar 24 further includes the front upper cross pipe 34 extending between the left and right middle side pipes 30, 30 in front of the top middle cross pipe 35. The front upper cross pipe 34 is located inwardly in the vehicle width direction with respect to a left and right front joint portions 134, 134 in which the front upper cross pipe 34 is joined to the left and right middle side pipes 30, 30, and extends in a forward position of the vehicle with respect to these left and right front joint portions 134, 134.

Figure 6:
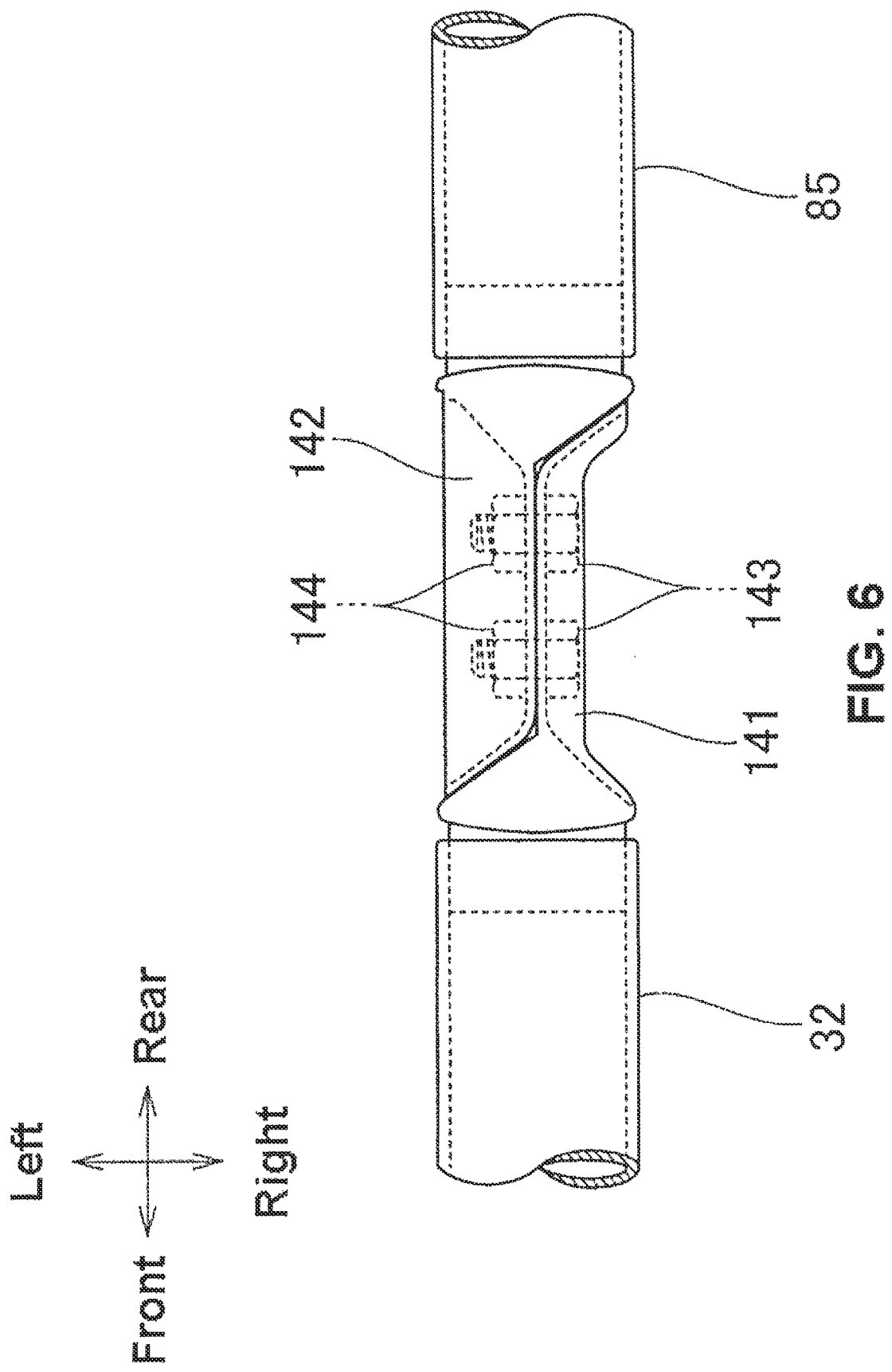
FIG. 6 is a view of assistance in explaining the coupling construction between a front roof rail side and a rear roof rail side.

Next, the coupling construction between a front roof rail side and a rear roof rail side will be explained. As shown in FIG. 6, a rearwardly projecting first coupling lip 141 is fitted into a rear end of the front roof side rail 32 thereby to be welded together, while a forwardly projecting second coupling lip 142 is fitted into a front end of the rear roof side rail 85 thereby to be welded together.

Then, an inner surface in the vehicle width direction of the first coupling lip 141 abuts on an outer surface in the vehicle width direction of the second coupling lip 142. When the first coupling lip 141 and the second coupling lip 142 are joined together by a bolt 143 and a nut 144 each axis of which extends in the vehicle width direction, the front roof side rail 32 and the rear roof side rail 85 are joined together.

Next, the mounting construction of the rear upper cross pipe will be explained. An explanation hereunder will be made with respect to the left side mounting construction in the vehicle width direction. Since the mounting constructions are symmetrical in relation to each other, an explanation of the right side mounting construction in the vehicle width direction will be omitted.

Figure 7:
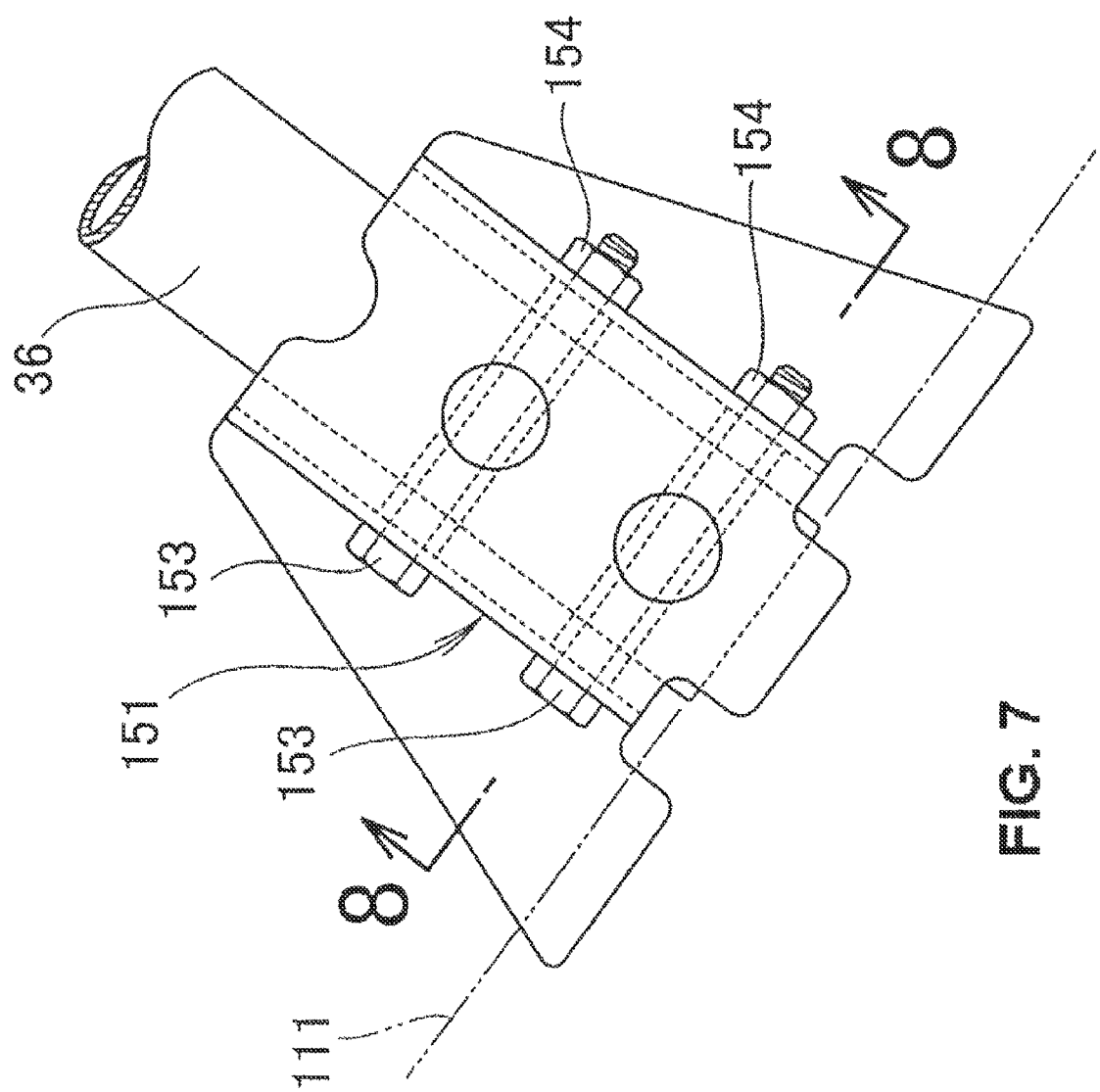
FIG. 7 is a view of assistance in explaining a mounting construction of a rear upper cross pipe.

As shown in FIG. 7, a rear upper cross mounting bracket 151 is welded to a rear upper portion of the rear side pipe 111. To this rear upper cross mounting bracket 151 an end of the rear upper cross pipe 36 is joined by bolts 153 and nuts 154.

Figure 8:
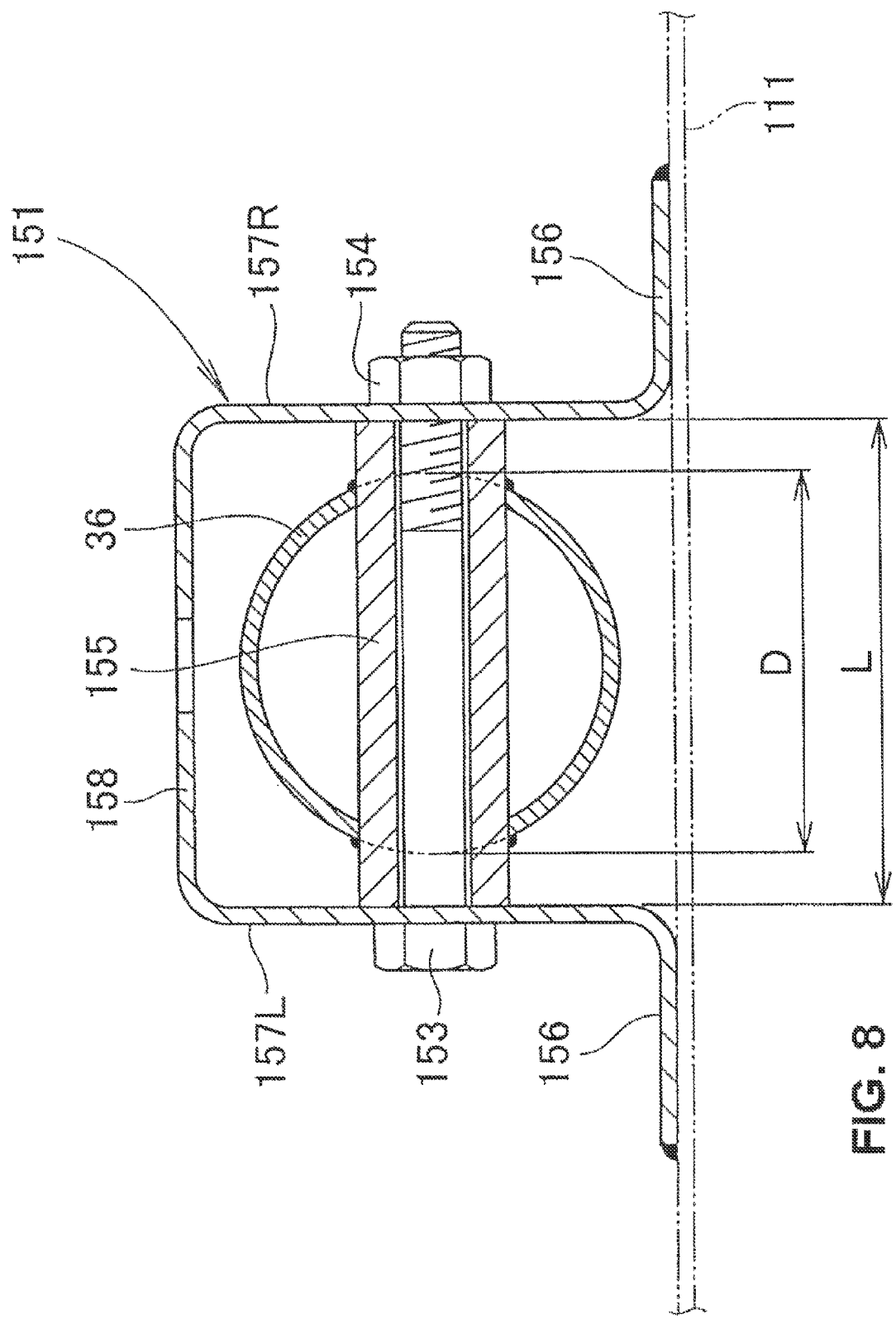
FIG. 8 is a cross sectional view taken along line 8-8 of FIG. 7.

As shown in FIG. 8, a collar member 155 passes through and is welded to the rear upper cross pipe 36. The length (L) in an axial direction of the collar member 155 is greater than an outer diameter (D) of the rear upper cross pipe 36 (D<L). The rear upper cross mounting bracket 151 includes flange sections 156, 156 which are welded to the rear side pipe 111, left and right walls 157L, 157R extending upwardly from the flange sections 156, 156 so as to allow end surfaces of the collar member 155 to be set thereon, and a rear ceiling section 158 extending between the left and right walls 157L, 157R.

The collar member 155 is set at each end thereof between the left and right walls 157L, 157R of the rear upper cross mounting bracket 151, and the rear upper cross pipe 36 is fixedly fastened to the rear upper cross mounting bracket 151 by the bolt 153 passing thought the collar member 155 and the nut 154.

The operation of the rough-terrain traveling vehicle as mentioned above will be hereafter explained.

As shown in FIGS. 4 and 5, the left gusset 102L is provided in a spanning fashion at the assembly point 101L where the left middle side pipe 30L and the top middle cross pipe 35 are assembled or connected. The front seat roll bar 24 is firmly reinforced by the left gusset 102L.

In addition, the left and right gussets 102L, 102R provided at the left and right assembly points where the left and right middle side pipes 30L, 30R and the top middle cross pipe 35 are assembled or connected, are formed with the vertical surfaces (the butted surfaces 122, 122). The front seat roll bar 24 and the rear seat roll bar 25 are joined to the vertical surfaces 122, 122 through the assembly screw (the fastening bolts 103, 103) extending in the forward and rearward direction of the vehicle. By virtue of this construction, when the rear seat roll bar 25 has been removed, rearwardly protruding projections can be eliminated from the front seat roll bar 24. As a result, it is possible to provide the rough-terrain traveling vehicle capable of being used even in the case where only the front seat roll bar 24 is mounted on the vehicle body frame 20.

As shown in FIG. 5, since an axis 103J of the fastening bolt 103 (assembly screw) is located in the position that is offset inwardly in the vehicle width direction from the center axis 32C of the front roof side rail 32 and from the center axis 85C of the rear roof side rail 85, it is possible to improve the workability for attaching and removing the rear seat roll bar 25 relative to the front seat roll bar 24.

The left front pipe (the front roof side rail 32) that forms the front seat roll bar 24 and the left rear pipe (the rear roof side rail 85) that forms the rear seat roll bar 25 and extends in the forward and rearward direction of the vehicle, have substantially the same positions in the height direction and in the vehicle width direction. Namely, since the front roof side rail 32 and the rear roof side rail 85t are coupled linearly in alignment with each other in front of and in the rear of the vehicle, the rigidity of the roll bars 24, 25 can be increased in comparison with the case where they do not extend linearly in alignment with each other in front of and in the rear of the vehicle.

The top middle cross pipe 35 is bent forwardly in the vicinity of the joined section to the left middle side pipe 30, and one pipe between the left middle side pipe 30 and the top middle cross pipe 35 has the terminal end thereof at the joined point while the other pipe extends in the forward direction of the vehicle from the joined point. Like this, since the assembly screw (the fastening bolt 103) for coupling is arranged in a space formed by a bend R of the one pipe, it is possible to effectively use the space which is otherwise liable to become dead space, and the left coupling section 135 can be made in a more compact fashion.

As above, although the construction of the left gusset provided on the left side in the vehicle width direction, and of its neighboring part have been explained, the right gusset provided on the right side in the vehicle width direction, and its neighboring part are constructed symmetrical with respect to the center line in the vehicle width direction, so that the explanation will be omitted.

As shown in FIG. 2, the front upper cross pipe 34 is located inwardly in the vehicle width direction with respect to the left and right joint portions 134, 134 and extends in the forward position of the vehicle with respect to the left and right front joint portions 134, 134. Namely, since the front upper cross pipe 34 is located more forwardly in the vehicle width direction, the head of the passenger of the front seat 27 can be prevented from coming in contact with the front upper cross pipe 34 when the front seat passenger moves left and right within the vehicle, so that the comfortableness of the passenger sitting on the front seat 27 can be improved.

As shown in FIG. 3, the left and right middle side pipes 30, 30 include the left and right first middle side pipes 137L, 137R and the left and right second middle side pipes 138L, 138R. Namely, since the left and right middle side pipes 30, 30 are separable or dividable in the forward and rearward direction of the vehicle, the front seat roll bar 24 can be decreased in size when being disassembled, while maintaining the rigidity of the front seat roll bar 24.

Similarly, since the rear seat roll bar 25 is formed with three-piece construction comprising the left and right rear side pipes 111L, 111R and the rear upper cross pipe 36 extending between the left and right rear side pipes 111L, 111R, the rear seat roll bar 25 can be decreased in size when being disassembled, while maintaining the rigidity of the rear seat roll bar 25.

As shown in FIG. 1, the middle side pipe 30 extends diagonally upwardly to the rear from the vehicle body frame mounting portion 140. Thus, the middle side pipe 30 which extends diagonally upwardly to the rear from the vehicle body frame mounting portion 140 can be brought close to the diagonally rearwardly and upwardly extending inclination angle of the upper half of the passenger that sits on the front seat 27 when the passenger of the front seat 27 gets on and off the vehicle, so that it is possible to improve the getting on and off performance of the passenger of the front seat 27.

By the way, although the present invention has been applied to the rough-terrain traveling vehicle in the embodiment, it is applicable to a three-wheeled vehicle and may be applied to general vehicles.

The present invention is suitable for the rough-terrain traveling vehicle equipped with the roll bar.

DESCRIPTION OF REFERENCE CHARACTERS

10: Vehicle (Rough-terrain traveling vehicle), 20: Vehicle body frame, 24: Front seat roll bar, 25: Rear seat roll bar, 27: Front seat, 28: Rear seat, 30L, 30R: Left and right middle side pipes, 32: Left and right front pipes (Front roof side rails), 34: Front upper cross pipe, 35: Top middle cross pipe, 36: Rear upper cross pipe, 37: Driver's seat, 38: Passenger seat (Front seat passenger seat), 85: Left and right rear pipes (Rear roof side rails), 101L, 101R: Left and right assembly points, 102L, 102R: Left and right gussets, 103: Attachment screw (Fastening bolt), 111L, 111R: Left and right rear side pipes, 122: Surface (Butted surface), 133: Bend portion (Forward bend portion), 134: Left and right front joint portion, 135L, 135R: Left and right coupling sections, 137L, 137R: Left and right first middle side pipes, 138L, 138R: Left and right second middle side pipes, 140: Vehicle body frame mounting portion.

What is claimed is:

1. A rough-terrain traveling vehicle comprising:
    a front seat including a driver's seat on which a driver sits for steering and a passenger seat arranged side by side with the driver's seat so as to allow at least one front seat passenger to sit thereon,
    a rear seat located to a rear of the front seat so as to allow at least one rear seat passenger to sit thereon, said rear seat being foldably or removably mounted to the vehicle,
    a front seat roll bar for the front seat and a rear seat roll bar for the rear seat, said front seat and rear seat roll bars cover upper sides of the driver, the front seat passenger and the rear seat passenger, said front seat and rear seat roll bars being provided separately in a removable manner,
    wherein the front seat roll bar includes a top middle cross pipe extending leftward and rightward in a vehicle width direction above a rear part of the front seat, and left and right middle side pipes extending from a vehicle body frame to the top middle cross pipe on outer sides in the vehicle width direction of the front seat,
    wherein a left gusset extends between the left middle side pipe and the top middle cross pipe at a left assembly point where the left middle side pipe and the top middle cross pipe are connected, and a right gusset extends between the right middle side pipe and the top middle cross pipe at a right assembly point where the right middle side pipe and the top middle cross pipe are connected,
    wherein the left and right gussets include surfaces that are perpendicular to an extending direction of left and right attachment screws, respectively, so as to couple the rear seat roll bar to the front seat roll bar when the left and right attachment screws are fitted in the gussets through the surfaces in a forward and rearward direction of the vehicle, and
    wherein the top middle cross pipe extends outwardly from a center in the vehicle width direction and then is bent forwardly in the vicinity of joined sections to the left and right middle side pipes, one pipe between each of the left and right middle side pipes and the top middle cross pipe has an end at a joined position while the other pipe between each of the left and right middle side pipes and the top middle cross pipe extends further in the forward direction of the vehicle from the joined position, and the left and right gussets extend from the one pipe to the other pipe on a large scale whereby to form left and right coupling sections to which the rear seat roll bar is coupled.

2. The rough-terrain traveling vehicle according to claim 1, further comprising left and right front pipes extending in the forward and rearward direction of the vehicle to form the front seat roll bar, and left and right rear pipes extending in the forward and rearward direction of the vehicle to form the rear seat roll bar, wherein the left and right front pipes and the left and right rear pipes have substantially the same positions in a height direction and in the vehicle width direction, and wherein the attachment screws are located in positions offset inwardly from each of center axes of left and right front pipes and each of center axes of the left and right rear pipes.

3. The rough-terrain traveling vehicle according to claim 2, wherein the left and right middle side pipes for forming the front seat roll bar include left and right first middle side pipes and left and right second middle side pipes extending in the rearward direction of the left and right first middle side pipes, and wherein the rear seat roll bar includes left and right rear side pipes and a rear upper cross pipe extending between the left and right rear side pipes.

4. The rough-terrain traveling vehicle according to claim 3, wherein vehicle body frame mounting portions in which the left and right middle side pipes are mounted on the vehicle body frame are located in a forward position of the vehicle with respect to the left and right coupling sections, and the left and right middle side pipes extend diagonally upwardly to the rear from the vehicle body frame mounting portions.

5. The rough-terrain traveling vehicle according to claim 3, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

6. The rough-terrain traveling vehicle according to claim 2, wherein vehicle body frame mounting portions in which the left and right middle side pipes are mounted on the vehicle body frame are located in a forward position of the vehicle with respect to the left and right coupling sections, and the left and right middle side pipes extend diagonally upwardly to the rear from the vehicle body frame mounting portions.

7. The rough-terrain traveling vehicle according to claim 6, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

8. The rough-terrain traveling vehicle according to claim 2, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

9. The rough-terrain traveling vehicle according to claim 1, wherein vehicle body frame mounting portions in which the left and right middle side pipes are mounted on the vehicle body frame are located in a forward position of the vehicle with respect to the left and right coupling sections, and the left and right middle side pipes extend diagonally upwardly to the rear from the vehicle body frame mounting portions.

10. The rough-terrain traveling vehicle according to claim 9, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

11. The rough-terrain traveling vehicle according to claim 1, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

12. The rough-terrain traveling vehicle according to claim 1, wherein the left and right middle side pipes for forming the front seat roll bar include left and right first middle side pipes and left and right second middle side pipes extending in the rearward direction of the left and right first middle side pipes, and wherein the rear seat roll bar includes left and right rear side pipes and a rear upper cross pipe extending between the left and right rear side pipes.

13. The rough-terrain traveling vehicle according to claim 12, wherein vehicle body frame mounting portions in which the left and right middle side pipes are mounted on the vehicle body frame are located in a forward position of the vehicle with respect to the left and right coupling sections, and the left and right middle side pipes extend diagonally upwardly to the rear from the vehicle body frame mounting portions.

14. The rough-terrain traveling vehicle according to claim 12, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

15. The rough-terrain traveling vehicle according to claim 1, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

16. A rough-terrain traveling vehicle comprising:
a front seat including a driver's seat on which a driver sits for steering and a passenger seat arranged side by side with the driver's seat so as to allow at least one front seat passenger to sit thereon,
a rear seat located to a rear of the front seat so as to allow at least one rear seat passenger to sit thereon, said rear seat being foldably or removably mounted to the vehicle,
a front seat roll bar for the front seat and a rear seat roll bar for the rear seat, said front seat and rear seat roll bars cover upper sides of the driver, the front seat passenger and the rear seat passenger, said front seat and rear seat roll bars being provided separately in a removable manner,
wherein the front seat roll bar includes a top middle cross pipe extending leftward and rightward in a vehicle width direction above a rear part of the front seat, and left and right middle side pipes extending from a vehicle body frame to the top middle cross pipe on outer sides in the vehicle width direction of the front seat,
wherein a left gusset extends between the left middle side pipe and the top middle cross pipe at a left assembly point where the left middle side pipe and the top middle cross pipe are connected, and a right gusset extends between the right middle side pipe and the top middle cross pipe at a right assembly point where the right middle side pipe and the top middle cross pipe are connected,
wherein the left and right gussets include surfaces that are perpendicular to an extending direction of left and right attachment screws, respectively, so as to couple the rear seat roll bar to the front seat roll bar when the left and right attachment screws are fitted in the gussets through the surfaces in a forward and rearward direction of the vehicle, and
wherein the left and right middle side pipes for forming the front seat roll bar include left and right first middle side pipes and left and right second middle side pipes extending in the rearward direction of the left and right first middle side pipes, and wherein the rear seat roll bar includes left and right rear side pipes and a rear upper cross pipe extending between the left and right rear side pipes.

17. The rough-terrain traveling vehicle according to claim 16, wherein vehicle body frame mounting portions in which the left and right middle side pipes are mounted on the vehicle body frame are located in a forward position of the vehicle with respect to the left and right coupling sections, and the left and right middle side pipes extend diagonally upwardly to the rear from the vehicle body frame mounting portions.

18. The rough-terrain traveling vehicle according to claim 17, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

19. The rough-terrain traveling vehicle according to claim 16, wherein the front seat roll bar further includes a front upper cross pipe extending between the left and right middle side pipes in front of the top middle cross pipe, and the front upper cross pipe is located inwardly in the vehicle width direction, with respect to left and right front joint portions in which the front upper cross pipe is joined to the left and right middle side pipes, and extends in a forward position of the vehicle with respect to the left and right front joint portions.

* * * * *